US012630089B2

(12) United States Patent
Ignaczak et al.

(10) Patent No.: US 12,630,089 B2
(45) Date of Patent: May 19, 2026

(54) VEHICLE VISION SYSTEM

(71) Applicant: FORD GLOBAL TECHNOLOGIES, LLC, Dearborn, MI (US)

(72) Inventors: Brad Ignaczak, Canton, MI (US);
David Hiskens, Ypsilanti, MI (US);
Martin van Hoeckel, Woodstock (CA);
Jonathan Diedrich, Carleton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 78 days.

(21) Appl. No.: 18/645,591

(22) Filed: Apr. 25, 2024

(65) Prior Publication Data

US 2025/0332996 A1 Oct. 30, 2025

(51) Int. Cl.
| *B60R 1/27* | (2022.01) |
| *H04N 23/54* | (2023.01) |
| *H04N 23/65* | (2023.01) |
| *H04N 23/695* | (2023.01) |
| *H04N 23/90* | (2023.01) |

(52) U.S. Cl.
CPC ............... *B60R 1/27* (2022.01); *H04N 23/54* (2023.01); *H04N 23/65* (2023.01); *H04N 23/695* (2023.01); *H04N 23/90* (2023.01); *B60R 2300/101* (2013.01); *B60R 2300/105* (2013.01)

(58) Field of Classification Search
CPC ....... B60C 23/00; B60C 23/0408; B60R 1/02; B60R 1/04; B60R 1/06; B60R 1/12; B60R 1/1207; B60R 1/26; B60R 1/28; B60R 1/29

USPC ......................................................... 348/148
See application file for complete search history.

(56) References Cited

U.S. PATENT DOCUMENTS

| 8,786,713 | B1 | 7/2014 | Tamasanis |
| 10,196,005 | B2 | 2/2019 | Eytan et al. |
| 11,680,786 | B2 | 6/2023 | Sharma et al. |
| 11,700,439 | B2 | 7/2023 | Skrocki et al. |
| 2005/0264777 | A1 | 12/2005 | Gardner et al. |
| 2015/0174715 | A1 | 6/2015 | Kang |
| 2017/0290170 | A1 | 10/2017 | Low et al. |
| 2018/0004004 | A1 | 1/2018 | Tamasanis et al. |
| 2018/0042106 | A1 | 2/2018 | Scheja |
| 2019/0193648 | A1 | 6/2019 | Eytan et al. |

(Continued)

FOREIGN PATENT DOCUMENTS

| DE | 102018211309 A1 | 1/2020 |
| WO | 2023126632 A1 | 7/2023 |

*Primary Examiner* — Masum Billah
(74) *Attorney, Agent, or Firm* — Vincent Mastrogiacomo; Brooks Kushman P.C.

(57) ABSTRACT

A vision sensor includes a housing, a lens, a circuit board, an image sensor, and an actuator. The housing defines an internal cavity and an orifice providing access to the internal cavity. The lens is disposed within the orifice, is secured to the housing such that a position of the lens is affixed relative to the housing, and defines a focal plane within the internal cavity. The circuit board is disposed within the internal cavity and is secured to the housing such that a position of the circuit board is affixed relative to the housing and relative to the lens. The image sensor is disposed within the internal cavity and is connected to the circuit board. The actuator is configured to adjust a position of the image sensor relative to the circuit board to align the image sensor with the focal plane.

20 Claims, 3 Drawing Sheets

(56)　　　　　　　　References Cited

U.S. PATENT DOCUMENTS

| | | | |
|---|---|---|---|
| 2022/0030145 | A1 | 1/2022 | Lu et al. |
| 2022/0103723 | A1* | 3/2022 | Skrocki ................. H04N 23/55 |
| 2022/0377213 | A1 | 11/2022 | White et al. |
| 2023/0148358 | A1* | 5/2023 | Sharma ................. H04N 23/55 |
| | | | 348/345 |

* cited by examiner

VEHICLE VISION SYSTEM

TECHNICAL FIELD

The present disclosure relates to vehicles and vision sensors configured to observe the immediate surroundings of the vehicle.

BACKGROUND

Vehicles and automobiles may include sensing systems that are configured to provide notification regarding the surroundings of the vehicle and provide input for various vehicle subsystems.

SUMMARY

A vision system for a vehicle includes a housing a lens, a printed circuit board, an electrical connector, an electrical interface, an image sensor, and an actuator. The housing defines an internal cavity, a first orifice providing access to the internal cavity, and a second orifice providing access to the internal cavity. The lens is secured to the housing, is disposed within the first orifice, and defines a focal plane within the internal cavity. The printed circuit board is disposed within the internal cavity. The electrical connector is secured to the housing and is disposed externally on an opposing side of the second orifice relative to the internal cavity. The electrical interface extends from the printed circuit board, through the second orifice, and to the electrical connector. The electrical interface establishes an electrical connection between the printed circuit board and the electrical connector, is secured to the housing within the second orifice, and affixes a position of the printed circuit board within the internal cavity. The image sensor is disposed within the internal cavity and is electrically connected with the printed circuit board. The actuator is disposed on the printed circuit board and is configured to adjust a position of the image sensor relative to the printed circuit board to align the image sensor with the focal plane.

A vision sensor includes a housing, a lens, a circuit board, an image sensor, and an actuator. The housing defines an internal cavity and an orifice providing access to the internal cavity. The lens is disposed within the orifice, is secured to the housing such that a position of the lens is affixed relative to the housing, and defines a focal plane within the internal cavity. The circuit board is disposed within the internal cavity and is secured to the housing such that a position of the circuit board is affixed relative to the housing and relative to the lens. The image sensor is disposed within the internal cavity and is connected to the circuit board. The actuator is configured to adjust a position of the image sensor relative to the circuit board to align the image sensor with the focal plane.

A method of manufacturing a vision sensor, the vision sensor having a lens, a circuit board, and an image sensor includes: affixing a position of the lens onto a base structure of the vision sensor; affixing a position of the circuit board onto the base structure and relative to the lens; attaching the image sensor to the circuit board via at least one actuator; and adjusting a position of the image sensor relative to the circuit board via the at least one actuator to algin the image sensor with a focal plane that is defined by the lens.

DETAILED DESCRIPTION

Figure 1:
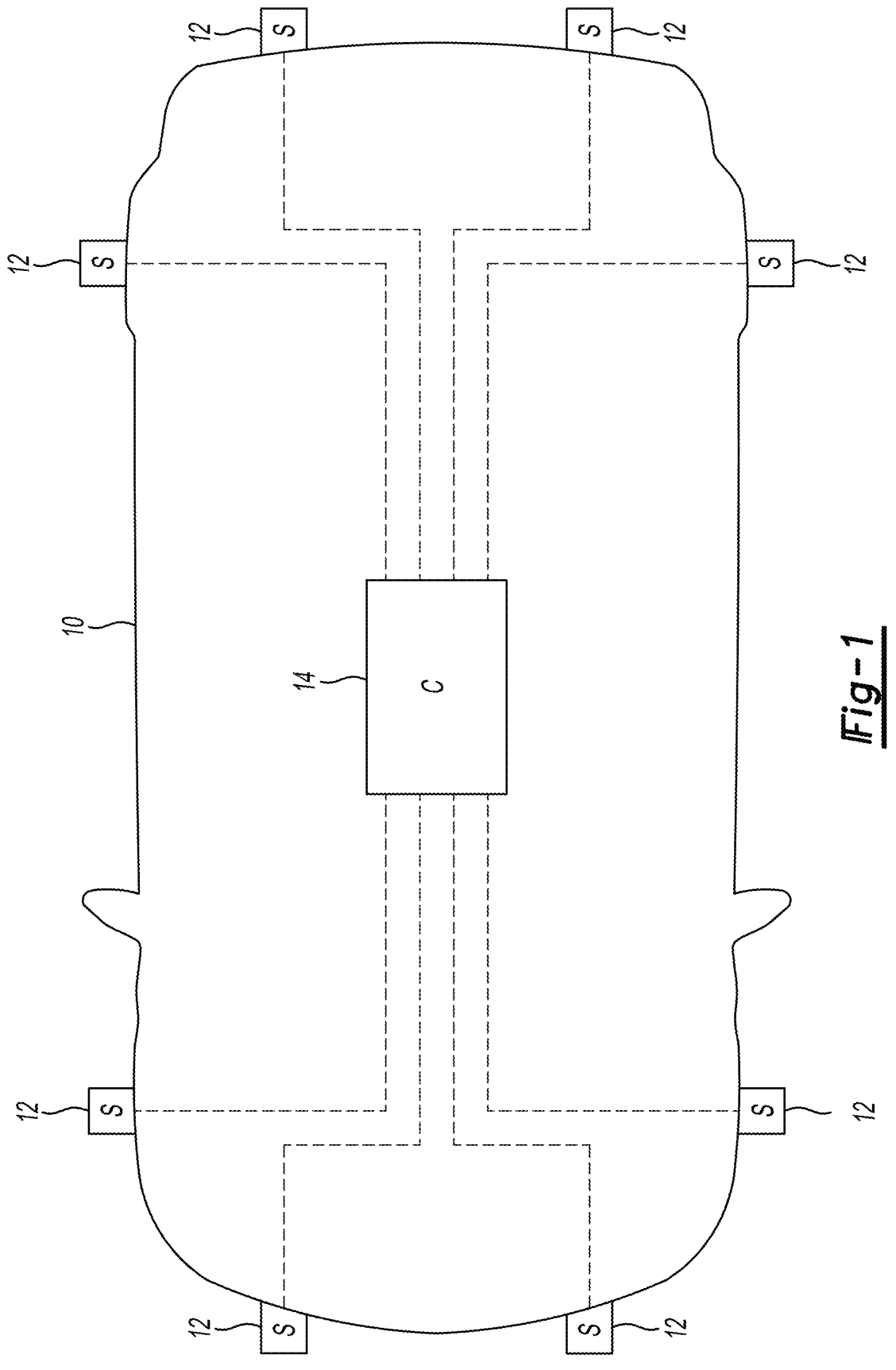
FIG. 1 is a schematic illustration of a vehicle having a vision system and one or more corresponding vision sensors.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

One of the key steps in the automotive camera manufacturing process is focus alignment. The lens needs to be precisely aligned with the image sensor to achieve the required level of image quality. In today's camera manufacturing process, the image sensor is rigidly mounted to a circuit board prior to focus alignment. During focus alignment according to current processes, the circuit board is manipulated in X, Y, and Z positions along the circuit board and along a tilt angle relative to the lens so that the image sensor is precisely aligned with the focal plane defined by the lens. The circuit board is then permanently affixed in that precise position relative to the lens using an adhesive. The adhesive is then cured in an oven.

Such a lens alignment process is complex and requires expensive equipment, resulting in higher manufacturing expense. First, the process requires an active alignment machine to identify the optimal six degree of freedom focus position and tilt. It then must manipulate the circuit board precisely to that position and tilt angle, followed by applying an adhesive to fix the circuit board in position. Then the assembly is moved to a curing oven for the adhesive to cure. The final position of the circuit board is at an angle relative to the camera connector, and that angle is not the same for every manufactured automotive camera. The angle between the tilted circuit board and the camera connector requires a complex interface component to ensure a reliable electrical connection, resulting in added expense and increased camera size. In some applications such as advanced driver assistance systems and 360° cameras, there is a subsequent calibration process after the camera has been mounted on the vehicle.

The idea disclosed herein is a modification to the camera manufacturing lens alignment process at the camera that reduces the manufacturing expense and increases camera reliability. Manufacturing expense is reduced by eliminating the need for an active alignment machine and curing oven, through use of an image sensor actuator capable of translating and tilting the image sensor. It also increases reliability by reducing the tilt angle of the circuit board relative to the camera housing and interconnecting components.

As with current processes, the image sensor chip is attached to a circuit board prior to starting lens alignment. The circuit board is then affixed to the camera housing. This can be done with standard manufacturing tolerances without the need for production equipment that determines the misalignment between the lens and the circuit board or equipment that manipulates the circuit board to align the image sensor with the lens focal plane. The image sensor is then manipulated in X, Y, and Z positions along the circuit board and the tilt angle relative to the lens using an image sensor actuator, which does not require any manufacturing equipment, and can take place optionally at a later step at the camera manufacturing facility, at an alignment/calibration step in vehicle assembly, or during an online calibration process after production while the vehicle is being driven. In this process, the image sensor actuator moves the image sensor relative to the circuit board, so that the image sensor is precisely aligned with the lens focal plane. Rather than the complex fixtures and equipment used in the current processes, a much simpler camera fixture and target can be utilized.

The position of the image sensor is stored in memory, so at each subsequent power cycle the camera can read the stored position from memory and move the sensor to its aligned position. As cameras age, there will be minor changes in the z axis position of the image sensor along the circuit board and the tilt angle between the lens and image sensor. There is not a mechanism to compensate for changes caused by aging in the current processes, but with the proposed addition of an image sensor actuator, it is possible to compensate for changes caused by aging and to reduce the effect of aging related image quality reduction.

Referring to FIG. 1, a schematic of a vehicle 10 is illustrated. The vehicle may include a sensing system or vison system that includes one or more cameras or vision sensors 12. The vision sensors 12 may be in communication with a controller. 14. The controller 14 may be programmed to control a variety of vehicle subsystems based on selected modes and/or various conditions input into the controller 14. For example, the controller 14 may be configured to control vehicle maneuvering based on inputs received from the vison sensors 12 (e.g., the controller 14 may be configured to control the speed of the vehicle 10 and slowing of the vehicle 10 once an adaptive cruise control system is activated to maintain a desired distance between the front of the vehicle 10 and another vehicle detected by one or more of the vision sensors 12; and/or the controller 14 may be configured to control the speed of the vehicle 10, slow of the vehicle 10, and steering of the vehicle 10 to maneuver away from an object detected by one or more of the vision sensors 12). The controller 14 may also be configured to output the view of one or more of the vision sensors 12 onto a display screen that is viewable by a vehicle operator (e.g., the controller 14 may execute a backup assist operation where a rear view of the vehicle 10 is output to a display screen that is viewable by the driver of the vehicle 10). Such visions sensors 12 may also be utilized inside the cabin of the vehicle 10 (e.g., some vision sensors 12 may be mounted on the dash or ceiling to view driver and other occupants).

While illustrated as one controller, the controller 14 may be part of a larger control system and may be controlled by various other controllers throughout the vehicle 10, such as a vehicle system controller (VSC). It should therefore be understood that the controller 14 and one or more other controllers can collectively be referred to as a "controller" that controls various actuators in response to signals from various sensors to control functions the vehicle 10 or vehicle subsystems. The controller 14 may include a microprocessor or central processing unit (CPU) in communication with various types of computer readable storage devices or media (e.g., a non-transitory computer readable medium having instructions stored thereon). Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 14 in controlling the vehicle 10 or vehicle subsystems.

Control logic or functions performed by the controller 14 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 14. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The controller 14 may be configured to receive various states or conditions of the various vehicle components illustrated in FIG. 1 via electrical signals. The electrical signals may be delivered to the controller 14 from the various components via input channels. Additionally, the electrical signals received from the various components may be indicative of a request or a command to change or alter a state of one or more of the respective components of the vehicle 10. The controller 14 includes output channels that are configured to deliver requests or commands (via electrical signals) to the various vehicle components. The controller 14 includes control logic and/or algorithms that are configured to generate the requests or commands delivered through the output channels based on the requests, commands, conditions, or states of the various vehicle components received via the input channels.

The input channels and output channels are illustrated as dotted lines in FIG. 1. It should be understood that a single dotted line may be representative of both an input channel and an output channel into or out of a single element. Furthermore, an output channel out of one element may operate as an input channel to another element and vice versa.

Figures 2, 3, 4:
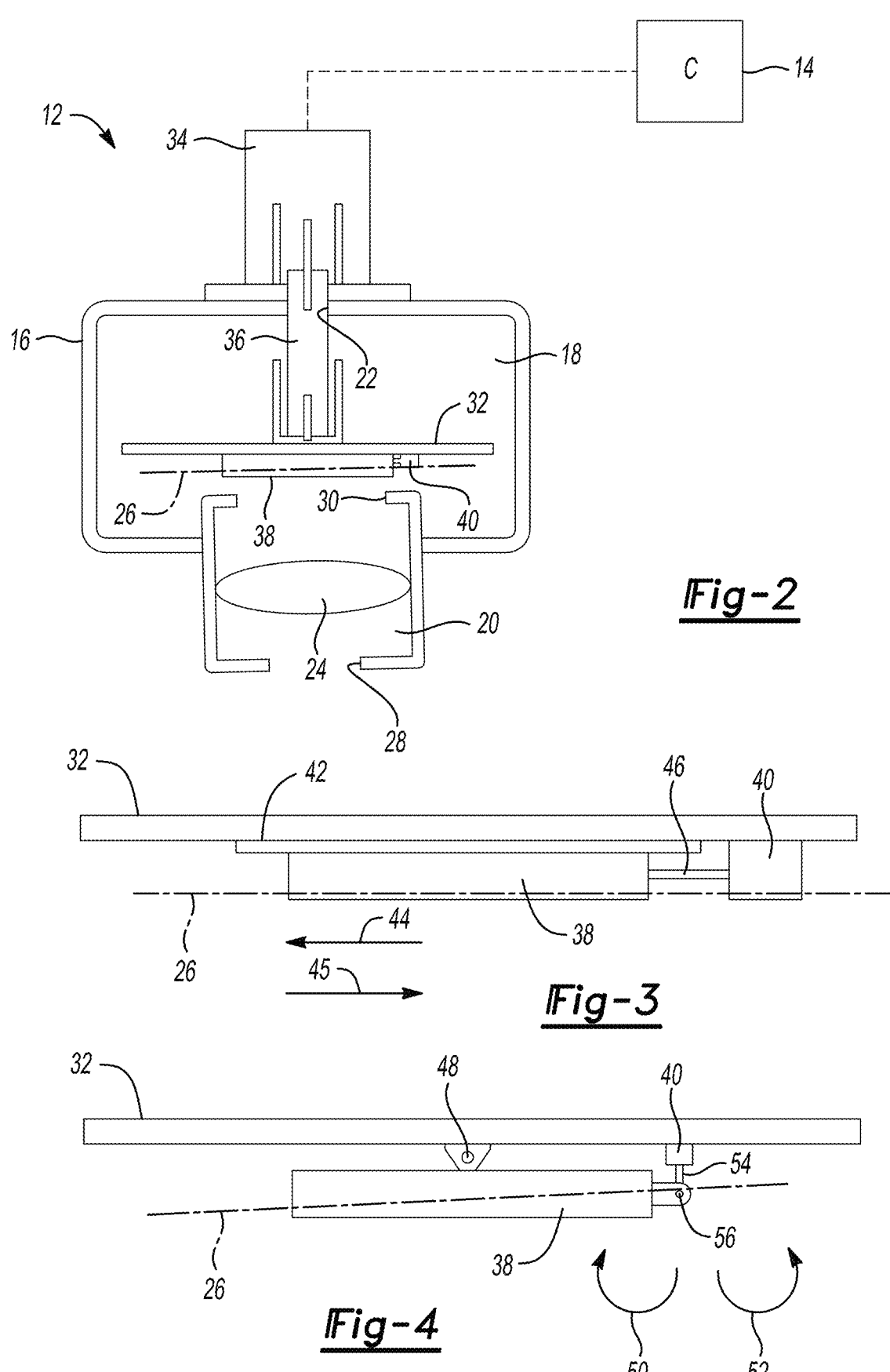
FIG. 2 is a schematic illustration of a vision sensor.
FIG. 3 is a schematic illustration of a first type of actuator that is configured to adjust a position of an image sensor that forms a portion of the vision sensor.
FIG. 4 is a schematic illustration of a second type of actuator that is configured to adjust the position of the image sensor.

Referring to FIGS. 2-4, the vision system is illustrated in further detail. More specifically, one of the vision sensors 12 and the controller 14 are illustrated in FIG. 2 while portions of the vision sensor 12 are illustrated in FIGS. 3 and 4. The vision sensor 12 may include a base structure, such as a housing 16. The housing 16 may define an internal cavity 18. The housing 16 may also define a first orifice 20 providing access to the internal cavity 18. The housing 16 may also define a second orifice 22 providing access to the internal cavity 18. A lens 24 is secured to the housing 16. The lens 24 is disposed within first orifice 20. The lens 24 defines a focal plane 26 within the internal cavity 18. The lens 24 may be secured to the housing such that a position of the lens 24 is affixed relative to the housing 16. The first orifice 20 may more specifically comprise a second cavity having an inlet orifice 28 and an outlet orifice 30.

The vision sensor 12 may further include a printed circuit board 32. The printed circuit board 32 is disposed within the internal cavity 18 and is secured to the housing 16 such that a position of the printed circuit board 32 is affixed relative to the housing 16 and relative to the lens 24. An electrical connector 34 is secured to the housing 16. The electrical connector 34 is disposed externally on the housing 16 and on an opposing side of the second orifice 22 relative to the internal cavity 18. The electrical connector 34 is also disposed externally on the housing 16 and on an opposing side of the housing 16 relative to the internal cavity 18.

An electrical interface 36 may extend from the printed circuit board 32. More specifically, the electrical interface 36 may extend from the printed circuit board 32, through the second orifice 22, and to the electrical connector 34. The electrical interface 36 may establish an electrical connection between the printed circuit board 32 and the electrical connector 34. The electrical interface 36 may be secured to the housing 16 within the second orifice 22. The electrical interface 36 may physically secure the printed circuit board 32 to the housing 16 and affix the position of the printed circuit board 32 within the internal cavity 18 relative to the housing 16. The electrical connector 34 and the electrical interface 36 may include base structures, such as casings or housings, and electrical elements (e.g., wires, contacts, etc.) that are secured to or housed within such base structures. The electrical elements of the electrical connector 34 and the electrical interface 36 establish the electrical connections between the electrical connector 34, the electrical interface 36, and the printed circuit board 32 while the casings or housings of the electrical connector 34 and the electrical interface 36 provide rigid structures for the electrical connector 34 and the electrical interface 36 that operate to maintain relative positions of the electrical connector 34 and the electrical interface 36.

The vision sensor 12 may further include an image sensor 38. The image sensor 38 may be an image sensor chip, a bar die image sensor, a complementary metal oxide semiconductor (CMOS), or any other type of sensor capable capturing images that is known in the art. The image sensor 38 is disposed within the internal cavity 18. The image senor 38 is electrically connected with the printed circuit board 32. An actuator 40 is configured to adjust a position of the image sensor 38 relative to the circuit board 32 to align the image sensor 38 with the focal plane 26 defined by the lens 24. The actuator 40 may be disposed within the internal cavity 18. The actuator 40 may also be disposed on and/or physically connected to the printed circuit board 32. The actuator 40 may also be electrically connected to the printed circuit board 32. The actuator 40 may be an electrical solenoid, an electrical motor (e.g., a servo motor), an electrical cylinder, or any other actuator known in the art.

The controller 14 may be electrically connected to the printed circuit board 32, image sensor 38, and actuator 40 via the electrical connector 34 and the electrical interface 36. The controller 14 may be programmed to operate the actuator 40 to adjust the position of the image sensor 38 relative to the printed circuit board 32 to align the image sensor 38 with the focal plane 26. The controller 14 may be further programmed to store a desired position of the image sensor 38 (e.g., a position of the image sensor 38 relative to the printed circuit board 32 that corresponds to the image sensor 38 being aligned with the focal plane 26 defined by the lens 24) into an electronic memory (e.g., a computer readable storage device or media). The image sensor 38 is illustrated as being aligned with the focal plane 26 in FIG. 3 and out of alignment with the focal plane 26 in FIG. 4.

The controller 14 may also be programmed to operate the actuator 40 to relocate the image sensor 38 to the desired position in response to initiation of a power cycle (e.g., turning an ignition of the vehicle 10 to an "ON" position) and the image sensor 38 not being in the desired position. The controller 14 may be further programmed to, in response to changes in the desired position of the image sensor 38, update the desired position of the image sensor 38 and operate the actuator 40 to relocate the image sensor 38 to the updated desired position. The desired position may change as components of the vision sensor 12 wear or shift out of position resulting in a misalignment of the image sensor 38 with the focal plane 26. Such misalignment may occur over an extended period of time or in response to ending a power cycle (e.g., turning the ignition of the vehicle 10 to an "OFF" position).

The actuator 40 may include one or more actuators and may be configured to linearly translate the image sensor 38 relative to the printed circuit board 32 or to rotate or pivot the image sensor 38 relative to the printed circuit board 32. The one or more actuators may linearly translate the image sensor 38 in multiple directions relative to the printed circuit board 32 (e.g., according to a Cartesian coordinate system having X, Y, and Z axes where the X and Y axes define an exterior surface of the printed circuit board 32, the image sensor 38 may be linearly translated in directions along the X and Y axes and along the exterior surface of the printed circuit board 32 and/or in a direction along the Z axis toward or away from the exterior surface of the printed circuit board 32).

An example of an actuator 40 that is configured to linearly translate the image sensor 38 along an exterior surface of the printed circuit board 32 is illustrated in FIG. 3. In this example, the image sensor 38 is slidably secured to the printed circuit board 32 via a linear guide 42, such as a linear rail. The actuator 40 in the form of an electrical solenoid or electrical cylinder is secured to the printed circuit board 32, attached to the image sensor 38, and is configured to linearly slide the image sensor 38 in forward and rearward in directions 44, 45. The actuator 40 may include a push rod 46 that is attached to the image sensor 38. The push rod 46 is configured to extend to push the image sensor 38 in the forward direction 44 and retract to pull the image sensor 38 in the rearward in direction 45. It should be understood that the configuration described in FIG. 3 is for illustrative purposes and that any linear translating system known in the art may be utilized to linearly adjust the position of the image sensor 38 relative to the printed circuit board.

The one or more actuators may rotate or pivot the image sensor 38 in multiple directions relative to the printed circuit board 32 (e.g., according to a Cartesian coordinate system having X, Y, and Z axes where the X and Y axes define an exterior surface of the printed circuit board 32, the image sensor 38 may be rotated about the X, Y, and Z axes relative to the printed circuit board 32). An example of an actuator 40 that is configured to rotate or pivot the image sensor 38 relative to the printed circuit board 32 is illustrated in FIG. 4. In this example, the image sensor 38 is rotatably secured to the printed circuit board 32 via a hinge or pivot 48. The actuator 40 in the form of an electrical solenoid or electrical cylinder is secured to the printed circuit board 32, attached to the image sensor 38, and is configured to rotate or pivot the image sensor 38 in opposing rotational directions 50, 52. The actuator 40 may include a push rod 54 that is attached to the image sensor 38 via a pinned connection 56. The push rod 54 is configured to rotate or pivot about the pinned connection 56. The push rod 46 is configured to extend to push the pinned connection 56 away from the printed circuit board 32 resulting in rotating or pivoting the image sensor in direction 50 relative to the printed circuit board 32. The push rod 46 is configured to retract to pull the pinned connection 56 toward from the printed circuit board 32 resulting in rotating or pivoting the image sensor 38 in direction 52 relative to the printed circuit board 32. It should be understood that the configuration described in FIG. 4 is for illustrative purposes and that any rotating or pivoting system known in the art may be utilized to rotate or pivot the image sensor 38 relative to the printed circuit board 32.

Figure 5:
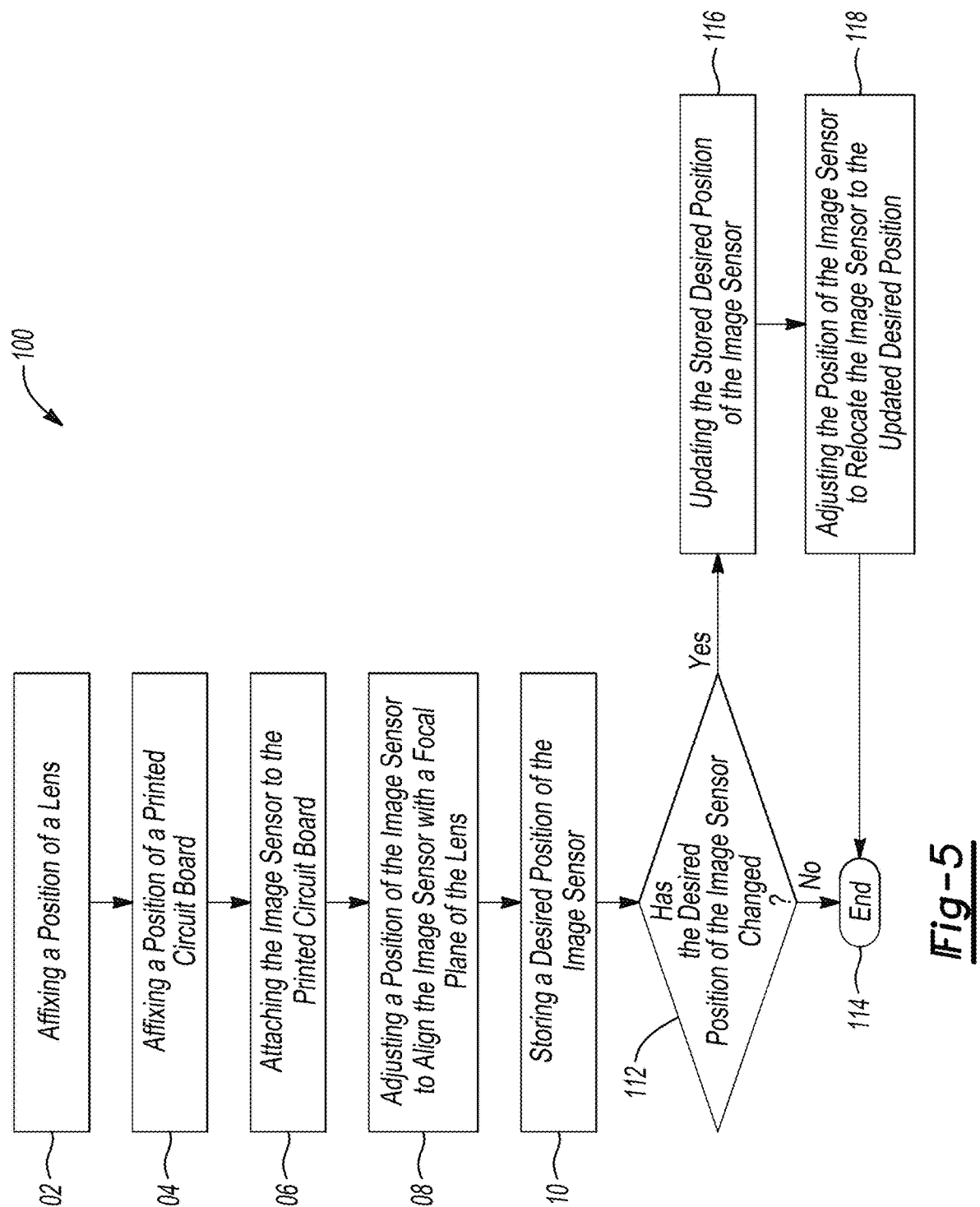
FIG. 5 is a flow chart of a method for manufacturing a vision sensor.

Referring to FIG. 5, a method 100 for manufacturing the vision sensor 12 and adjusting the position of the image sensor 38 is illustrated. The method 100, or at least a portion of the method 100, may be stored as control logic, algorithms, and/or instructions on a non-transitory computer readable medium that may be executed by a processor or controller (e.g., controller 14).

The method 100 begins at block 102 where the position of the lens 24 is affixed onto a base structure (e.g., the housing 16) of the vision sensor 12. Next, the method moves on to block 104 where the position of the printed circuit board 32 is affixed onto the base structure (e.g., the housing 16) of the vision sensor 12 and relative to the lens 24. The image sensor 38 is then attached to the printed circuit board 32 via the one or more actuators 40. The image sensor 38 may be attached to the printed circuit board prior 32 to affixing the printed circuit board 32 onto the base structure (e.g., the housing 16). More precisely, the step at block 106 may occur before the step at block 104. The position of the image sensor 38 relative to the circuit board 32 is then adjusted via the one or more actuators 40 at block 108 to algin the image sensor 38 with the focal plane 26 that is defined by the lens 24. Adjusting the position of the image sensor 38 may correspond to linearly translating the image sensor 38 relative to the circuit board 32, or rotating or pivoting the image sensor 38 relative to the circuit board 32.

Next, at block 110, a desired position of the image sensor 38 (e.g., a position of the image sensor 38 relative to the printed circuit board 32 that corresponds to the image sensor 38 being aligned with the focal plane 26 defined by the lens 24) is stored into an electronic memory (e.g., a computer readable storage device or media). The method 100 then determines if the desired position of the image sensor 38 has changed at block 112. If the desired position of the image sensor 38 has not changed, the method 100 ends at block 114. If the desired position of the image sensor 38 has changed (e.g., the image sensor 38 at the desired position is no longer aligned with the focal plane 26 due to a change in the positions of the lens 24 and/or focal plane 26 or due to a change in the position of the printed circuit board 32 on which the image sensor 38 is attached) the method 100 moves on to block 116 where the desired position of the image sensor 38 is updated and the updated desired position (e.g., a new position where the image sensor 38 is realigned with the focal plane 26) is stored into the electronic memory. The method 100 then moves on to block 118, where the position of the image sensor 38 is adjusted to relocate the image sensor 38 to the updated desired position. The chronological order of blocks 116 and 118 may be changed so the position of the image sensor 38 is first adjusted until the controller 14 recognizes that that the image sensor 38 is in focus and realigned with focal plane 26, followed by recording the new position where the image sensor 38 is in focus and realigned with focal plane 26 as the updated desired position. Upon completion of the step at block 118, the method ends at block 114.

It should be understood that the flowchart in FIG. 5 is for illustrative purposes only and that the method 100 should not be construed as limited to the flowchart in FIG. 5. Some of the steps of the method 100 may be rearranged while others may be omitted entirely.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vision system for a vehicle comprising:
   a housing defining an internal cavity, a first orifice providing access to the internal cavity, and a second orifice providing access to the internal cavity;
   a lens secured to the housing, disposed within the first orifice, and defining a focal plane within the internal cavity;

a printed circuit board disposed within the internal cavity;

an electrical connector secured to the housing, disposed externally on an opposing side of the second orifice relative to the internal cavity;

an electrical interface extending from the printed circuit board, through the second orifice, and to the electrical connector, wherein the electrical interface establishes an electrical connection between the printed circuit board and the electrical connector, is secured to the housing within the second orifice, and affixes a position of the printed circuit board within the internal cavity;

an image sensor disposed within the internal cavity and electrically connected with the printed circuit board; and an actuator disposed on the printed circuit board and configured to adjust a position of the image sensor relative to the printed circuit board to align the image sensor with the focal plane.

2. The vision system of claim 1 further comprising a controller programmed to operate the actuator to adjust the position of the image sensor relative to the printed circuit board to align the image sensor with the focal plane.

3. The vision system of claim 2, wherein a desired position of the image sensor relative to the printed circuit board corresponds to the image sensor being aligned with the focal plane, and wherein the controller is further programmed to (i) store the desired position of the image sensor and (ii) in response to initiation of a power cycle and the image sensor not being in the desired position, operate the actuator to relocate the image sensor to the desired position.

4. The vision system of claim 2, wherein a desired position of the image sensor relative to the printed circuit board corresponds to the image sensor being aligned with the focal plane, and wherein the controller is further programmed to (i) store the desired position of the image sensor and (ii) in response to changes in the desired position, update the desired position of the image sensor and operate the actuator to relocate the image sensor to the updated desired position.

5. The vision system of claim 1, wherein the actuator is configured to linearly translate the image sensor relative to the printed circuit board without repositioning the circuit board.

6. The vision system of claim 1, wherein the actuator is configured to rotate the image sensor relative to the printed circuit board without repositioning the circuit board.

7. A vision sensor comprising:

a housing defining an internal cavity and an orifice providing access to the internal cavity;

a lens disposed within the orifice, secured to the housing such that a position of the lens is affixed relative to the housing, and defining a focal plane within the internal cavity;

a circuit board disposed within the internal cavity and secured to the housing such that a position of the circuit board is affixed relative to the housing and relative to the lens;

an image sensor disposed within the internal cavity and connected to the circuit board; and an actuator disposed on the circuit board and configured to adjust a position of the image sensor relative to the circuit board without repositioning the circuit board to align the image sensor with the focal plane.

8. The vision sensor of claim 7 further comprising an electrical connector secured to the housing and disposed externally on an opposing side of the housing relative to the internal cavity.

9. The vision sensor of claim 8 further comprising an electrical interface extending from the circuit board and to the electrical connector, wherein the electrical interface (i) establishes an electrical connection between the circuit board and the electrical connector and (ii) operates to physically secure the circuit board to the housing and affix the position of the circuit board.

10. The vision sensor of claim 7 further comprising a controller programmed to operate the actuator to adjust the position of the image sensor relative to the circuit board to align the image sensor with the focal plane.

11. The vision sensor of claim 10, wherein a desired position of the image sensor relative to the circuit board corresponds to the image sensor being aligned with the focal plane, and wherein the controller is further programmed to (i) store the desired position of the image sensor and (ii) in response to initiation of a power cycle and the image sensor not being in the desired position, operate the actuator to relocate the image sensor to the desired position.

12. The vision sensor of claim 10, wherein a desired position of the image sensor relative to the circuit board corresponds to the image sensor being aligned with the focal plane, and wherein the controller is further programmed to (i) store the desired position of the image sensor and (ii) in response to changes in the desired position, update the desired position of the image sensor and operate the actuator to relocate the image sensor to the updated desired position.

13. The vision sensor of claim 7, wherein the actuator is configured to linearly translate the image sensor relative to the circuit board without repositioning the circuit board.

14. The vision sensor of claim 7, wherein the actuator is configured to rotate the image sensor relative to the circuit board without repositioning the circuit board.

15. A method of manufacturing a vision sensor, the vision sensor having a lens, a circuit board, and an image sensor comprising:

affixing a position of the lens onto a base structure of the vision sensor;

affixing a position of the circuit board onto the base structure and relative to the lens;

attaching the image sensor to the circuit board via at least one actuator; and adjusting a position of the image sensor relative to the circuit board via the at least one actuator after the circuit board has been affixed relative to the lens to algin the image sensor with a focal plane that is defined by the lens.

16. The method of claim 15 further comprising storing a desired position of the image sensor relative to the circuit board, wherein the desired position corresponds to the image sensor being aligned with the focal plane.

17. The method of claim 16 further comprising, in response to changes in the desired position, updating the stored desired position of the image sensor.

18. The method of claim 17 further comprising, in response updating the stored desired position of the image sensor, operating the actuator to relocate the image sensor to the updated desired position.

19. The method of claim 15, wherein adjusting a position of the image sensor includes linearly translating the image sensor relative to the circuit board without repositioning the circuit board.

20. The method of claim 15, wherein adjusting a position of the image sensor includes rotating the image sensor relative to the circuit board without repositioning the circuit board.

* * * * *